United States Patent
Wang et al.

(10) Patent No.: US 10,274,664 B2
(45) Date of Patent: Apr. 30, 2019

(54) LIGHT GUIDE ELEMENT, MANUFACTURING METHOD THEREOF AND BACKLIGHT ASSEMBLY

(71) Applicant: BOE TECHNOLOGY GROUP CO., LTD., Beijing (CN)

(72) Inventors: Jingquan Wang, Beijing (CN); Jing Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/561,174

(22) PCT Filed: Mar. 2, 2017

(86) PCT No.: PCT/CN2017/075451
§ 371 (c)(1),
(2) Date: Sep. 25, 2017

(87) PCT Pub. No.: WO2017/197955
PCT Pub. Date: Nov. 23, 2017

(65) Prior Publication Data
US 2018/0188442 A1    Jul. 5, 2018

(30) Foreign Application Priority Data
May 20, 2016   (CN) .......................... 2016 1 0342088

(51) Int. Cl.
*F21V 8/00*    (2006.01)
*G02B 6/00*    (2006.01)
*G02F 1/1335*  (2006.01)

(52) U.S. Cl.
CPC ............. *G02B 6/0041* (2013.01); *G02B 6/00* (2013.01); *G02B 6/0061* (2013.01); *G02B 6/0065* (2013.01); *G02F 1/133606* (2013.01)

(58) Field of Classification Search
CPC .. G02B 6/0065; G02B 6/0045; G02B 6/0051; G02B 6/0025; G02B 6/00; G02B 6/0003
(Continued)

(56) References Cited

U.S. PATENT DOCUMENTS

2004/0253427 A1* 12/2004 Yokogawa ............... G02B 1/10
                                                              428/212
2006/0071231 A1   4/2006 Han et al.
(Continued)

FOREIGN PATENT DOCUMENTS

CN    1755401 A    4/2006
CN    1896839 A    1/2007
(Continued)

OTHER PUBLICATIONS

Search Report and Written Opinion dated Jun. 7, 2017 from State Intellectual Property Office of the P.R. China.
(Continued)

*Primary Examiner* — William J Carter
(74) *Attorney, Agent, or Firm* — Dilworth & Barrese, LLP.; Michael J Musella, Esq.

(57) ABSTRACT

A light guide element, a manufacturing method thereof and a backlight assembly are provided. The light guide element includes: a scattering structure, including a plurality of aerogel particles, wherein the scattering structure includes a light incident surface and a light-emitting surface and is configured to receive incident light incident into the light incident surface and emit the incident light from the light-emitting surface, and a particle size of the aerogel particle is set according to a color difference of the incident light.

17 Claims, 3 Drawing Sheets

(58) Field of Classification Search
USPC .................................................. 362/600–634
See application file for complete search history.

(56) References Cited

U.S. PATENT DOCUMENTS

| | | | | |
|---|---|---|---|---|
| 2006/0152651 | A1* | 7/2006 | Negley | G02B 5/0247 349/64 |
| 2012/0113677 | A1 | 5/2012 | Huang et al. | |
| 2013/0098438 | A1 | 4/2013 | Kawai et al. | |
| 2014/0056024 | A1* | 2/2014 | Kim | G02B 6/003 362/608 |
| 2015/0253490 | A1 | 9/2015 | Zhang et al. | |
| 2015/0323711 | A1* | 11/2015 | Bessho | G02B 5/0242 349/71 |
| 2016/0146999 | A1 | 5/2016 | Yang et al. | |

FOREIGN PATENT DOCUMENTS

| | | |
|---|---|---|
| CN | 201032506 Y | 3/2008 |
| CN | 102073090 A | 5/2011 |
| CN | 102182966 A | 9/2011 |
| CN | 102298169 A | 12/2011 |
| CN | 102939663 A | 2/2013 |
| CN | 103487857 A | 1/2014 |
| CN | 103629627 A | 3/2014 |
| CN | 103851410 A | 6/2014 |
| CN | 103885117 A | 6/2014 |
| CN | 103917000 A | 7/2014 |
| CN | 104409592 A | 3/2015 |
| CN | 105891936 A | 8/2016 |
| JP | 2000294021 A | 10/2000 |
| JP | 2003272422 A | 9/2003 |

OTHER PUBLICATIONS

First Chinese Office Action dated Jul. 20, 2018.
Pro/Engineer; CAD/CAM/CAE basics and practice industrial applications; edited by Yunkie Walking Technology CAX Design Teaching and Research Office,Tsing-Hua University Press; Published Sep. 30, 2009.
Lindsey Sorensen, "Fabrication of Stable Low-Density Silica Aerogels Containing Luminescent ZnS Capped CdSe Quantum Dots", Advanced Materials, 2006, 1965-1967.
Second Chinese Office Action dated Nov. 27, 2018.

* cited by examiner

LIGHT GUIDE ELEMENT, MANUFACTURING METHOD THEREOF AND BACKLIGHT ASSEMBLY

TECHNICAL FIELD

Embodiments of the present invention relate to a light guide element, a manufacturing method thereof and a backlight assembly.

BACKGROUND

Currently, along with the continuous development of the display device market, a liquid crystal display (LCD) has become the first choice for mainstream display devices due to the advantages of rapid response speed, high integration, low power consumption, etc. The LCD generally comprises an array substrate, an opposed substrate and a liquid crystal molecule layer disposed between the array substrate and the opposed substrate. As the liquid crystal molecule layer does not have self-luminous function, a backlight assembly must be adopted to provide a backlight source for the LCD. The backlight assembly generally includes a light source and a light guide plate (LGP). A function of the LIGHT GUIDE PLATE is to make light emitted by the light source to emit uniformly from the light-emitting surface, so as to provide stable and uniform white backlight for the LCD.

SUMMARY

At least one embodiment of the present invention provides a light guide element, a manufacturing method thereof and a backlight assembly. The light guide element comprises: a scattering structure, including a plurality of aerogel particles, wherein the scattering structure includes a light incident surface and a light-emitting surface and is configured to receive incident light incident into the light incident surface and emit the incident light from the light-emitting surface, and a particle size of the aerogel particle is set according to a color difference of the incident light. By utilization of scattering function of the aerogel particles, the light guide element can improve the light-emitting uniformity and reduced and even completely eliminated the color difference.

At least one embodiment of the present invention provides a light guide element, comprising: a scattering structure, including a plurality of aerogel particles, wherein the scattering structure includes a light incident surface and a light-emitting surface and is configured to receive incident light incident into the light incident surface and emit the incident light from the light-emitting surface, and a particle size of the aerogel particle is set according to a color difference of the incident light.

For example, in the light guide element provided by an embodiment of the present invention, a range of the particle size of the aerogel particles is 190 nm-620 nm.

For example, in the light guide element provided by an embodiment of the present invention, the range of the particle size of the aerogel particles is 190 nm-230 nm.

For example, in the light guide element provided by an embodiment of the present invention, the range of the particle size of the aerogel particles is 570 nm-620 nm.

For example, in the light guide element provided by an embodiment of the present invention, in an incident direction of the incident light, the particle size of the aerogel particle is increased along with an increase of a distance between the aerogel particle and the light incident surface.

For example, in the light guide element provided by an embodiment of the present invention, in an incident direction of the incident light, the particle size of the aerogel particle is reduced along with an increase of a distance between the aerogel particle and the light incident surface.

For example, in the light guide element provided by an embodiment of the present invention, materials of the aerogel particle comprises one or more selected from silicon oxide, zirconium oxide and aluminum oxide.

For example, the light guide element provided by an embodiment of the present invention further comprises a plurality of luminous particles.

For example, in the light guide element provided by an embodiment of the present invention, a range of a particle size of the luminous particle is 190 nm-620 nm.

For example, in the light guide element provided by an embodiment of the present invention, in an incident direction of the incident light, the particle size of the luminous particle is increased along with an increase of a distance between the luminous particle and the light incident surface.

For example, in the light guide element provided by an embodiment of the present invention, in an incident direction of the incident light, the particle size of the luminous particle is reduced along with an increase of a distance between the luminous particle and the light incident surface.

For example, in the light guide element provided by an embodiment of the present invention, the luminous particles include nanometer-level optically excited particles.

For example, in the light guide element provided by an embodiment of the present invention, the luminous particle includes a core-shell structure comprising the nanometer-level optically excited particle as the core and the aerogel particle as the shell.

For example, in the light guide element provided by an embodiment of the present invention, the nanometer-level optically excited particles includes a quantum dot or nanometer fluorescent powder.

For example, the light guide element provided by an embodiment of the present invention further comprises: a reflecting film, disposed on other surfaces of the scattering structure except the light incident surface and the light-emitting surface.

At least one embodiment of the present invention provides a method for manufacturing a light guide element, comprising: obtaining a mixed solution by uniformly mixing raw materials for preparing aerogel and a solvent; obtaining gel by treating the mixed solution; and drying the gel to obtain a scattering structure including a plurality of aerogel particles, in which surfaces of the scattering structure include a light incident surface and a light-emitting surface.

For example, in the method for manufacturing a light guide element provided by an embodiment of the present invention, the raw materials for preparing the aerogel include alkoxide, and the solvent includes an alcoholic solvent.

For example, in the method for manufacturing a light guide element provided by an embodiment of the present invention, the alkoxide includes one or more selected from silicon alkoxide, aluminum alkoxide and zirconium alkoxide.

For example, the method for manufacturing a light guide element provided by an embodiment of the present invention further comprises: adjusting a pH value of the mixed solution to be 6-8, or obtaining the gel by volatilization of the solvent.

For example, the method for manufacturing a light guide element provided by an embodiment of the present invention further comprises: uniformly mixing a plurality of luminous particles and the mixed solution before obtaining the gel.

For example, in the method for manufacturing a light guide element provided by an embodiment of the present invention, the luminous particles include nanometer-level optically excited particles.

For example, the method for manufacturing a light guide element provided by an embodiment of the present invention further comprises: making a particle size or a density of the aerogel particle in the aerogel to have anisotropy by utilization of at least one of a flow rate of dry airflow or a heating temperature gradient.

At least one embodiment of the present invention provides a backlight assembly, comprising the light guide element as mentioned above.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In the study, an inventor of the present application has found that: due to the color difference of the light source itself in the backlight assembly and the light-absorbing function of the light guide plate on light emitted by the light source, a backlight provided by the backlight assembly will have color difference, so as to result in the phenomenon of bluing or yellowing images during displaying of the LCD, namely "cold screen" or "warm screen" phenomenon. In addition, after the light emitted by the light source is incident on the light guide plate, as the light is too concentrated, the problems such as bright and dark regions or eight bright lines may be still easily caused even after the light is scattered by dot patterns on the conventional light guide plate.

At least one embodiment of the present invention provides a light guide element, a manufacturing method thereof and a backlight assembly. The light guide element comprises: a scattering structure including a plurality of aerogel particles, and the scattering structure includes a light incident surface and a light-emitting surface and is configured to receive incident light incident on the light incident surface and transmit the incident light from the light-emitting surface. By utilization of high light transmittance and good light scattering performance of the aerogel materials, the light guide element can improve the light-emitting uniformity by scattering the incident light incident on the light incident surface via the aerogel particles included in the scattering structure. In addition, as the aerogel materials have low density, a weight of the light guide element can be also reduced, so the thinner and lighter design of the LCD can be achieved.

Description will be given below to the light guide element, the manufacturing method thereof and the backlight assembly, provided by embodiments of the present invention, with reference to the accompanying drawings.

A First Embodiment

Figure 1:
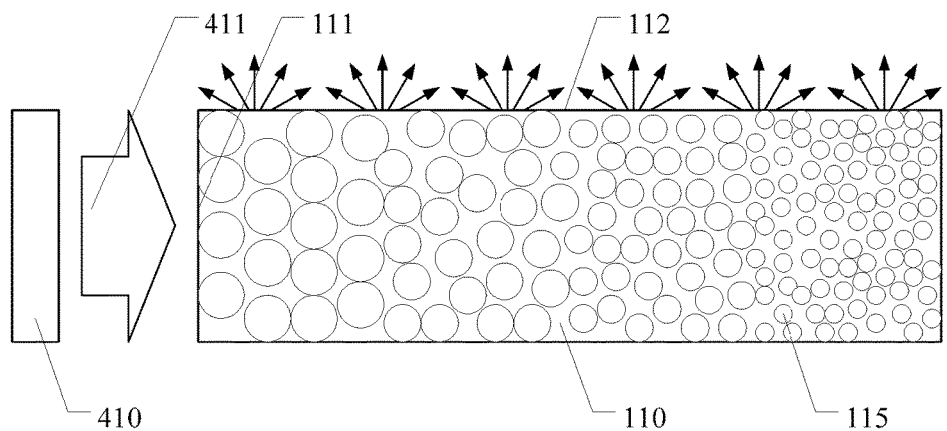
FIG. 1 is a schematic structural view of a light guide element provided by an embodiment of the present invention.

The embodiment provides a light guide element. FIG. 1 is a schematic cross-sectional view of the light guide element provided by the embodiment. As illustrated in FIG. 1, the light guide element comprises: a scattering structure 110 including a plurality of aerogel particles 115, the scattering structure 110 includes a light incident surface 111 and a light-emitting surface 112 and is configured to receive incident light 411 incident on the light incident surface 111 and emit the incident light 411 from the light-emitting surface 112.

For instance, as shown in FIG. 1, the scattering structure 110 may be an aerogel plate formed by the plurality of aerogel particles 115. In addition, the scattering structure 110 may include at least one light incident surface 111 and light-emitting surface 112. As shown in FIG. 1, a light source 410 is disposed on a side of the scattering structure 110; and a surface on a side provided with the light source 410 of the scattering structure 110 is the light incident surface 111. The incident light 411 emitted by the light source 410 is incident into the scattering structure 110 from the light incident surface 111 of the scattering structure 110, and emitted from the light-emitting surface 112 of the scattering structure 110. That is to say, in the embodiment, the light incident surface 111 is one side surface of the scattering structure 110, and the light-emitting surface 112 is one primary surface of the scattering structure 110. However, the embodiment of the present invention is not limited thereto. For instance, in an embodiment of the present invention, one primary surface of the scattering structure may be the light incident surface, and the other primary surface may be the light-emitting surface.

In the light guide element provided by the embodiment, the incident light 411 is incident into the scattering structure 110 from the light incident surface 111 of the scattering structure 110. As the scattering structure 110 includes the plurality of aerogel particles 115, the incident light 411 will be scattered when irradiated to these aerogel particles 115, so as to change relatively concentrated state of the incident light 411. Moreover, as the scattering structure 110 itself is composed of the plurality of aerogel particles 115 and the aerogel particles 115 may be uniformly distributed and adjustable, which can ensure that the incident light 411 is fully scattered, so as to improve the light-emitting uniformity of the light guide element and improve the light-emitting uniformity of a backlight assembly adopting the light guide element provided by the embodiment. When the incident light 411 is scattered by the aerogel particles 115, a portion of the incident light 411 is emitted from the light-emitting surface 112, so as to achieve the light guide function. On the other hand, a particle size of the aerogel particles 115 is usually in nanometer scale, and the aerogel particles 115 have Rayleigh scattering or Mie scattering effect. When the incident light 411 is scattered by the aerogel particles 115, according to the particle size of the aerogel particles 115, light with specific wavelength range (e.g., yellow light or blue light) in the incident light 411 has stronger scattering effect, and light with other wavelength ranges in the incident light 411 has relatively weaker scattering effect, so as to compensate the light with specific wavelength range, e.g., compensate the yellow light or the blue light. Thus, the color difference of emitted light of the light guide element can be reduced and even completely eliminated, so the whiteness of the emitted light of the light guide element can be improved, and hence stable and uniform white backlight can be provided. Therefore, the LCD adopting the light guide element provided by the embodiment can eliminate the phenomenon of bluing or yellowing images during displaying, namely "cold screen" or "warm screen" phenomenon. In addition, as a density of the aerogel materials is relatively low, a weight of the light guide element can be also reduced, so the lighter and thinner design of the LCD can be achieved.

For instance, in the light guide element provided by one example of the present embodiment, materials of the aerogel particles include one or more selected from silicon oxide, zirconium oxide and aluminum oxide.

For instance, in the light guide element provided by one example of the present embodiment, a particle size of at least one of the aerogel particle and luminous particle may be set according to the color difference of the incident light, so as to eliminate the color difference caused by yellowing of the incident light of the light source and provide stable and uniform white backlight.

For instance, in the light guide element provided by one example of the present embodiment, the particle size range of the aerogel particles is 190 nm-620 nm. When the particle size range of the aerogel particles is 190 nm-620 nm, the particles may have Rayleigh scattering or Mie scattering effect, so as to have the function of supplementing the light with specific wavelength range (e.g., blue light or yellow light).

For instance, when the incident light of the light source is yellowish, the particle size of the aerogel particles may be set to be 190 nm-230 nm, so as to form blue supplementary light, eliminate the color difference caused by yellowing of the incident light of the light source, and provide stable and uniform white backlight. For instance, when the incident light of the light source is bluish, the particle size of the aerogel particles may be set to be 570 nm-620 nm, so as to form yellow supplementary light, eliminate the color difference caused by bluing of the incident light of the light source, and provide stable and uniform white backlight. It should be noted that: when the particle size of the aerogel particles is about 200 nm, light with the wavelength of about 400 nm (namely blue light) in the incident light irradiated to the aerogel particles forms scattered light intensity peak; and when the particle size of the aerogel particles is about 600 nm, light with the wavelength of about 600 nm (namely yellow light) in the incident light irradiated to the aerogel particles forms scattered light intensity peak.

For instance, in the light guide element provided by one example of the present embodiment, in an incident direction of the incident light, the particle size of the aerogel particles is increased or reduced along with the increase of a distance between the aerogel particle and the light incident surface. Along with transmission of the incident light in the scattering structure, due to the supplementary function of the aerogel particles or the luminous particles, in the transmission process of the incident light, the degree of the color difference will be gradually increased. As the particle size of the aerogel particles is set to be increased or reduced along with the increase of the distance between the aerogel particle and the light incident surface, the effect of uniform chromaticity of emitting light can be achieved. That is to say, the particle size of the aerogel particles is set to be increased or reduced along with the increase of the distance between the aerogel particle and the light incident surface, so the supplementary function of the aerogel particles can be gradually improved. Thus, the supplementary function of the scattering structure on the incident light in the incident direction of the incident light can be stronger and stronger and be matched with the increase degree of the color difference, so as to achieve the effect of uniform chromaticity of emitting light.

For instance, when the incident light of the light source is yellowish, along with the transmission of the incident light in the scattering structure, due to the blue supplementing light function of the aerogel particles, in the transmission process of the incident light, blue light is gradually reduced and yellow light is gradually increased, so the yellowing degree is increased. At this point, the particle size of the aerogel particles may be set to be reduced along with the increase of the distance between the aerogel particle and the light incident surface, for instance, reduced from 230 nm to 190 nm. Thus, the blue supplementing light effect produced by the aerogel particles can be gradually increased and be matched with the increase degree of the color difference, so as to achieve the effect of uniform chromaticity of emitting light.

For instance, when the incident light of the light source is bluish, along with the transmission of the incident light in the scattering structure, due to the yellow supplementing light function of the aerogel particles, in the transmission process of the incident light, yellow light is gradually reduced and blue light is gradually increased, so the bluing degree is increased. At this point, the particle size of the aerogel particles may be set to be increased along with the increase of the distance between the aerogel particle and the light incident surface, for instance, increased from 570 nm to 620 nm. Thus, the yellow supplementing light effect produced by the aerogel particles can be gradually increased and be matched with the increase degree of the color difference, so as to achieve the effect of uniform chromaticity of emitting light.

Figure 2:
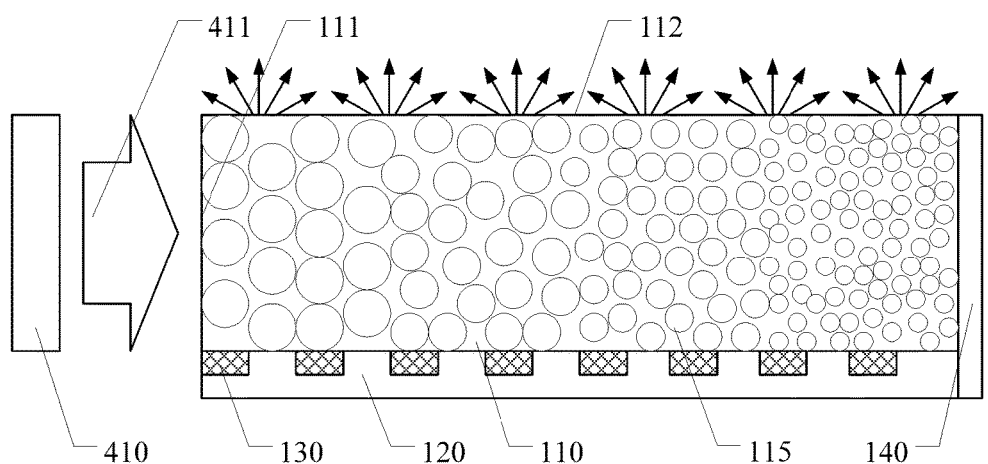
FIG. 2 is a schematic structural view of another light guide element provided by an embodiment of the present invention.

For instance, in the light guide element provided by one example of the present embodiment, FIG. 2 is a schematic cross-sectional view of the light guide element provided by one example of the embodiment. As illustrated in FIG. 2, the light guide element further comprises: a reflecting film 120 disposed on another surface of the scattering structure 110 except the light incident surface 111 and the light-emitting surface 112. As shown in FIG. 2, the incident light 411 is incident into the scattering structure 110 from the light incident surface 111 of the scattering structure 110, when the incident light 411 is irradiated to the aerogel particles 115, a portion of the incident light 411 is emitted from the light-emitting surface 112; a portion of the incident light 411 travel continuously in the scattering structure 110; and the portion of the incident light 411 may be reflected back to the scattering structure 110 by the reflecting film 120 and finally emitted from the light-emitting surface 112 when irradiated to other surfaces of the scattering structure 110 except the light incident surface 111 and the light-emitting surface 112. Thus, the reflecting film 120 can improve the light utilization rate of the light guide element. It should be noted that the reflecting film may be disposed on all other surfaces of the scattering structure except the light incident surface and the light-emitting surface. Of course, the embodiment includes but not limited thereto. For instance, as shown in FIG. 2, the reflecting film 120 may also be only disposed on a surface opposite to the light-emitting surface 112 of the scattering structure 110, and a light-shielding film 140 may be disposed on remaining surface.

For instance, in the light guide element provided by one example of the present embodiment, as shown in FIG. 2, the light guide element further comprises: a dot pattern 130 disposed between the scattering structure 110 and the reflecting film 120. Thus, the incident light 411 may be scattered by the dot pattern 130 when emitted to the reflecting film 120 or reflected back to the scattering structure 110 by the reflecting film 120, so as to further improve the light-emitting uniformity of the light guide element.

For instance, in the light guide element provided by one example of the present embodiment, the dot pattern may include bubbles.

Figure 3:
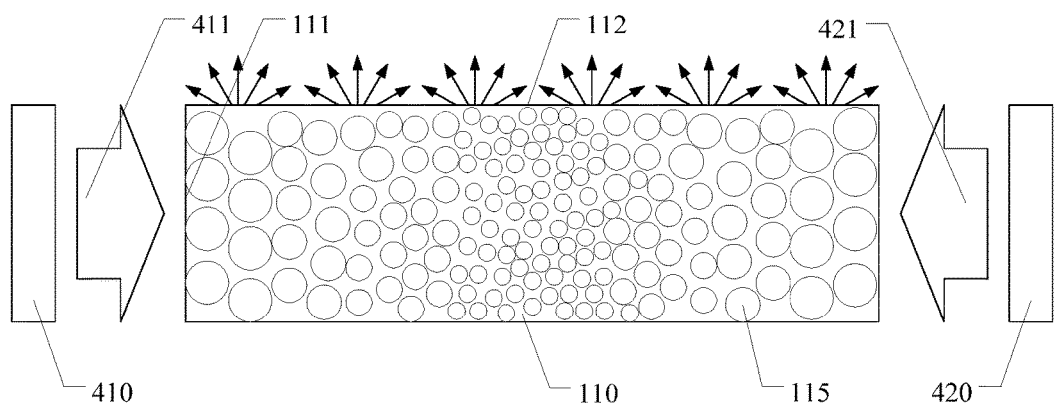
FIG. 3 is a schematic structural view of another light guide element provided by an embodiment of the present invention.

For instance, in the light guide element provided by one example of the present embodiment, as shown in FIG. 3 which is a schematic cross-sectional view of the light guide element provided by one example of the embodiment, a light source 410 and a light source 420 are disposed on two opposite sides of the scattering structure 110, and surfaces on both sides of the scattering structure 110, provided with the light source 410 and the light source 420, are light incident surfaces 111. In this case, the scattering structure 110 comprises two light incident surfaces 111. An incident light 411 emitted by the light source 410 and an incident light 421 emitted by the light source 420 are incident into the scattering structure 110 from the light incident surfaces 111 of the scattering structure 110 and emitted from the light-emitting surface 112 of the scattering structure 110. Thus, by providing the plurality of light incident surfaces 111, the uneven distribution of emitted light caused by intensity attenuation of light in the propagation process can be reduced, and hence further improve the light-emitting uniformity of the light guide element.

Figure 4:
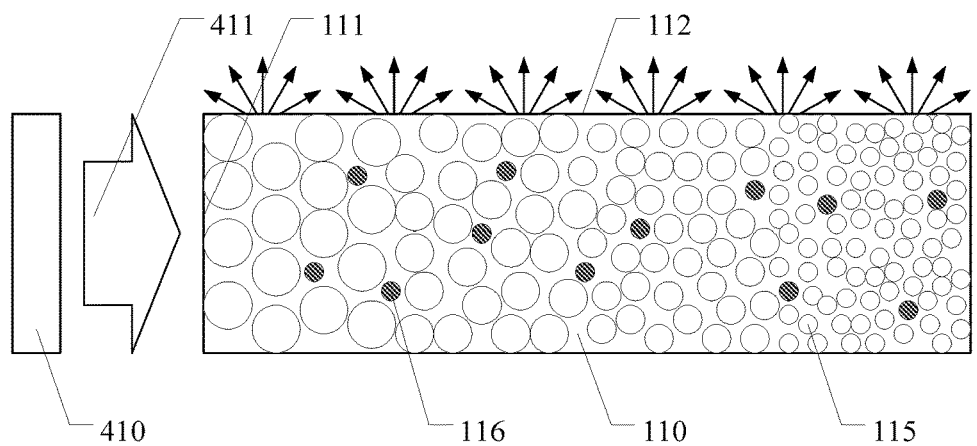
FIG. 4 is a schematic structural view of another light guide element provided by an embodiment of the present invention.

For instance, in the light guide element provided by one example of the present embodiment, as shown in FIG. 4 which is a schematic cross-sectional view of the light guide element provided by one example of the embodiment, the scattering structure 110 further comprises a plurality of luminous particles 116. The luminous particles 116 may also scatter the incident light 411 and hence improve the light-emitting uniformity of the light guide element. On the other hand, as a particle size of the luminous particles 116 is in the nanometer level, the luminous particles 116 also have Rayleigh scattering or Mie scattering effect. When the incident light 411 is scattered by the luminous particles 116, according to the particle size of the luminous particles 116, light with specific wavelength range (e.g., yellow light or blue light) in the incident light 411 has strong scattering effect, and light with other wavelength ranges in the incident light 411 has relatively weak scattering effect, so the light with specific wavelength range, e.g., the yellow light or the blue light can be supplemented. Thus, the color difference of emitted light of the light guide element can be reduced and even completely eliminated, so the whiteness of the emitted light of the light guide element can be improved, and hence stable and uniform white backlight can be provided. It should be noted that: when the particle size of the aerogel particles in the scattering structure is not in the nanometer level, by providing the plurality of luminous particles in the scattering structure, the same effect as the aerogel particles with nanometer scale can be achieved.

For instance, in the light guide element provided by one example of the embodiment, the luminous particles may include nanometer-level optically excited particles. The nanometer-level optically excited particles may be excited to emit light with specific wavelength, so as to further enhance the light supplementary ability of the light guide element on the light with specific wavelength range and provide stable and uniform white backlight.

For instance, the nanometer-level optically excited particles may be excited to emit yellow light or blue light. Thus, the light guide element can further improve the ability of supplementing the yellow light or the blue light, so the LCD adopting the light guide element provided by the embodiment can further eliminate the phenomenon of bluing or yellowing images during displaying, namely "cold screen" or "warm screen" phenomenon.

For instance, in the light guide element provided by one example of the present embodiment, the nanometer-level optically excited particles include quantum dots or nanometer-level fluorescent powder.

For instance, materials of the quantum dots may include one or more selected from carbon quantum dots, CdTe/CdS, CdS/CdTe/CdS, CdTe/CdS/CdS, CdTe/ZnS, CdTe/CdSe, CdTe/CdS/ZnS, CdTe/CdSe/CdTe and CdTe/CdSe/ZnS.

For instance, materials of the nanometer-level fluorescent powder may include one or more selected from Cs-doped TAG, Cs-doped TbAG, GaN and InGaN. Cs-doped TAG or TbAG may be excited to emit yellow light, and GaN or InGaN may be excited to emit blue light.

Figure 5:
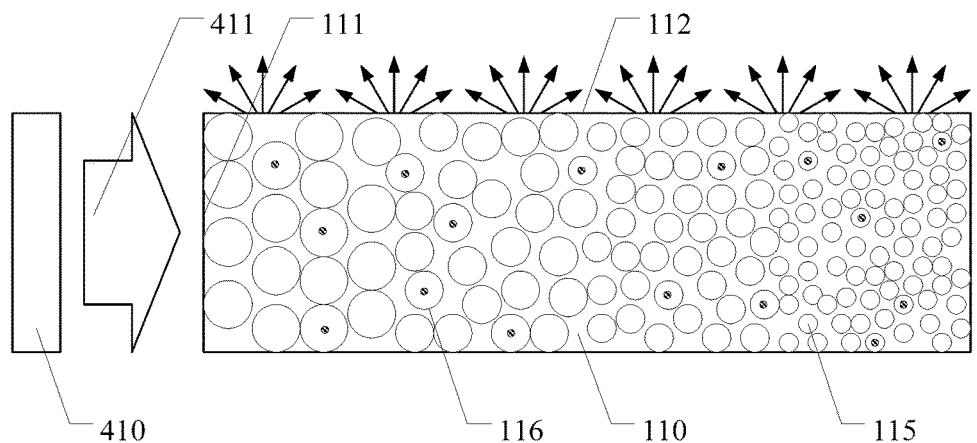
FIG. 5 is a schematic structural view of another light guide element provided by an embodiment of the present invention.

For instance, in the light guide element provided by one example of the present embodiment, as shown in FIG. 5 which is a schematic cross-sectional view of the light guide element provided by one example of the embodiment, the luminous particles 116 may include a core-shell structure comprising the nanometer-level optically excited particles as the core and the aerogel particles 115 as the shell. The aerogel particles 115 are waterproof and vapor-proof transparent materials, so the aerogel particles 115 may fully protect the nanometer-level optically excited particles and improve the stability and the light excitation efficiency of the nanometer-level optically excited particles.

For instance, in the light guide element provided by one example of the embodiment, the particle size range of at least one of the aerogel particle and the luminous particle (namely the aerogel particles, or the luminous particles, or, the aerogel particles and the luminous particles) is 190 nm-620 nm. When the particle size range of at least one of the aerogel particle and the luminous particle is 190 nm-620 nm, these particles may have Rayleigh scattering or Mie scattering effect, so as to achieve the light supplementary function on light with specific wavelength range (e.g., blue light and yellow light).

For instance, in the light guide element provided by one example of the embodiment, a particle size of at least one of the aerogel particle and the luminous particle may be set according to the color difference of the incident light. For instance, when the incident light of the light source is yellowish, the particle size of at least one of the aerogel particle and the luminous particle may be set to be 190 nm-230 nm, so as to form blue supplementary light, eliminate the color difference caused by yellowing of the incident light of the light source, and provide stable and uniform white backlight. For instance, when the incident light of the light source is bluish, the particle size of at least one of the aerogel particle and the luminous particle may be set to be 570 nm-620 nm, so as to form yellow supplementary light, eliminate the color difference caused by bluing of the incident light of the light source, and provide stable and uniform white backlight. It should be noted that: when the particle size of at least one of the aerogel particle and the luminous particle is about 200 nm, light with the wavelength of about 400 nm (namely blue light) in the incident light irradiated to the aerogel particles or the luminous particles forms scattered light intensity peak; and when the particle size of at least one of the aerogel particle and the luminous particle is about 600 nm, light with the wavelength of about 600 nm (namely yellow light) in the incident light irradiated to the aerogel particles or the luminous particles forms scattered light intensity peak.

For instance, in the light guide element provided by one example of the present embodiment, in an incident direction of the incident light, a density of the luminous particles is increased along with increase of a distance between the luminous particle and the light incident surface. Along with the transmission of the incident light in the scattering structure, an intensity of the incident light may be attenuated. At this point, by making the density of the luminous particles to be increased along with the increase of the distance between the luminous particle and the light incident surface, the light-emitting uniformity of the light guide element can be further improved. That is to say, by making the density of the luminous particles to be increased along with the increase of the distance between the luminous particle and the light incident surface, the scattering function of the scattering structure on the incident light in the incident direction of the incident light can be stronger and stronger and thus, be matched with the intensity attenuation of the incident light, so as to further improve the light-emitting uniformity of the light guide element. Of course, the embodiment includes but not limited thereto. In the incident direction of the incident light, the density of the aerogel particles may be also set to be reduced along with the increase of the distance between the luminous particle and the light incident surface.

For instance, in the light guide element provided by one example of the embodiment, in the incident direction of the incident light, the particle size of at least one of the aerogel particle and the luminous particle is increased or reduced along with the increase of a distance between at least one of the aerogel particle and the luminous particle and the light incident surface. Along with the transmission of the incident light in the scattering structure, due to the light supplementary function of the aerogel particles or the luminous particles, during transmission of the incident light, the degree of the color difference will be gradually increased. As the particle size of at least one of the aerogel particle and the luminous particle is set to be increased or reduced along with the increase of the distance between at least one of the aerogel particle and the luminous particle and the light incident surface, the effect of uniform light-emitting chromaticity can be achieved. That is to say, the particle size of the aerogel particle is set to be increased or reduced along with the increase of the distance between the aerogel particle and the light incident surface, or, the particle size of the luminous particle is set to be increased or reduced along with the increase of the distance between the luminous particle and the light incident surface, or, the particle size of the aerogel particle and the luminous particle is simultaneously set to be increased or reduced along with the increase of the distance between the aerogel particle and the luminous particle and the light incident surface, so as to gradually improve the light supplementary function of the aerogel particles or the luminous particles. Thus, the light supplementary function of the scattering structure on the incident light in the incident direction of the incident light can be stronger and stronger and be matched with the increase degree of the color difference, so as to achieve the effect of uniform light-emitting chromaticity.

For instance, when the incident light of the light source is yellowish, along with the transmission of the incident light in the scattering structure, due to the blue light supplementing function of the aerogel particles or the luminous particles, in the transmission process of the incident light, blue light is gradually reduced and yellow light is gradually increased, so the yellowing degree is increased. At this point, the particle size of at least one of the aerogel particle and the luminous particle may be set to be reduced along with the increase of the distance between at least one of the aerogel particle and the luminous particle and the light incident surface (that is to say, the particle size of the aerogel particles is reduced along with the increase of the distance between the aerogel particle and the light incident surface, or the particle size of the luminous particles is reduced along with the increase of the distance between the luminous particle and the light incident surface, or the particle size of the aerogel particles and the luminous particles is reduced along with the increase of the distance between the aerogel particle and the luminous particle and the light incident surface), for instance, reduced from 230 nm to 190 nm. Thus, the blue light supplementing effect produced by at least one of the aerogel particle and the luminous particle can be gradually increased and be matched with the increase degree of the color difference, so as to achieve the effect of uniform light-emitting chromaticity.

For instance, when the incident light of the light source is bluish, along with the transmission of the incident light in the scattering structure, due to the yellow light supplementing function of the aerogel particles or the luminous particles, in the transmission process of the incident light, yellow light is gradually reduced and blue light is gradually increased, so the bluing degree is increased. At this point, the particle size of at least one of the aerogel particle and the luminous particle may be set to be increased along with the increase of the distance between at least one of the aerogel particle and the luminous particle and the light incident surface (that is to say, the particle size of the aerogel particles is increased along with the increase of the distance between the aerogel particle and the light incident surface, or the particle size of the luminous particles is increased along with the increase of the distance between the luminous particle and the light incident surface, or the particle size of the aerogel particles and the luminous particles is increased along with the increase of the distance between the aerogel particle and the luminous particle and the light incident surface), for instance, increased from 570 nm to 620 nm. Thus, the yellow light supplementing effect produced by at least one of the aerogel particle or the luminous particle can be gradually increased and be matched with the increase degree of the color difference, so as to achieve the effect of uniform light-emitting chromaticity.

It should be noted that when the luminous particles mentioned above include the nanometer-level optically excited particles or the core-shell structure comprising the nanometer-level optically excited particle as the core and the aerogel particle as the shell, as the luminous particles have the function of being excited to emit light, the luminous particles also have the light supplementary function on light with specific wavelength (e.g., blue light or yellow light). In this case, the density of the nanometer-level optically excited particles or the core-shell structure comprising the nanometer-level optically excited particle as the core and the aerogel particle as the shell, may also be set to be increased along with the distance between the luminous particle and the light incident surface. Thus, corresponding light supplementary effect can be increased and may be matched with the increase degree of the color difference, so as to achieve the effect of uniform light-emitting chromaticity. The solution of solving the problem of the gradual increase of the color difference of the incident light by setting the particle size of at least one of the aerogel particle and the luminous particle, and the solution of solving the problem of the gradual increase of the color difference of the incident light by setting the density of the nanometer-level optically excited particles or the core-shell structure comprising the nanometer-level optically excited particle as the core and the aerogel particle as the shell, may be independently used and may also be combined in use.

It should be noted that the light guide element provided by the embodiment may be used together with the conventional light guide plate, for instance, attached to a light-emitting surface of the conventional light guide plate, so as to improve the light-emitting uniformity of the light guide plate and reduce and even eliminate the color difference of emitted light of the light guide plate. Of course, the embodiment of the present invention includes but not limited thereto. The light guide element provided by the embodiment may be independently used to replace the conventional light guide plate.

Figure 6:
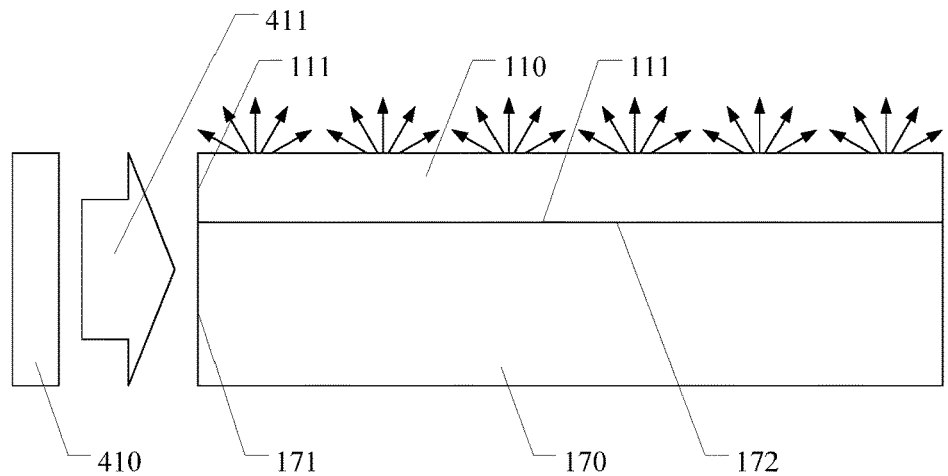
FIG. 6 is a schematic structural view of another light guide element provided by an embodiment of the present invention.

For instance, FIG. 6 is a schematic cross-sectional view of a light guide element provided by one example of the embodiment. As illustrated in FIG. 6, the light guide element further comprises: an light guide plate 170, the light guide plate 170 includes at least one light incident surface 171 and light-emitting surface 172, a scattering structure 110 may be disposed on the light-emitting surface 172 of the light guide plate 170, and the light-emitting surface 172 of the light guide plate 170 is attached to a light incident surface 111 of the scattering structure 110. Thus, the light-emitting uniformity of the light guide plate 170 can be improved, and the color difference of the emitted light of the light guide plate 170 can be reduced and even eliminated. It should be noted that: in the light guide element provided by the embodiment, as shown in FIG. 6, a side of the scattering structure 110 close to the light source 410 may also include one light incident surface 111, and the incident light 411 emitted by the light source 410 may be simultaneously incident on the light incident surface 111 on the side of the scattering structure 110 close to the light source 410 and the light incident surface 171 of the light guide plate 170.

A Second Embodiment

Figure 7:
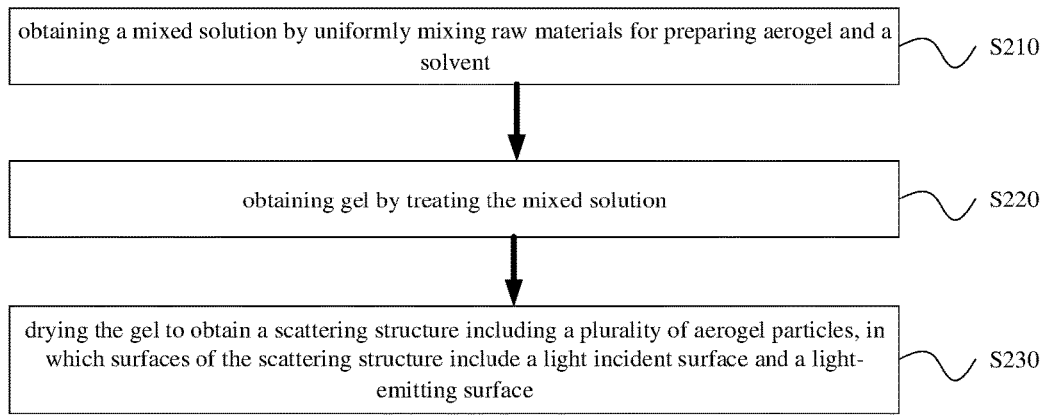
FIG. 7 is a flow diagram of a method for manufacturing a light guide element, provided by an embodiment of the present invention.

The embodiment provides a method for manufacturing a light guide element. As shown in FIG. 7, the method for manufacturing the light guide element comprises the following steps S210-S230:

S210: obtaining a mixed solution by uniformly mixing a raw material for preparing aerogel and a solvent;

S220: obtaining a gel by treating the mixed solution; and

S230: drying the gel to obtain a scattering structure including a plurality of aerogel particles, in which surfaces of the scattering structure include a light incident surface and a light-emitting surface.

For instance, the scattering structure including the plurality of aerogel particles may be obtained by heating, ambient pressure drying or supercritical drying.

In the method for manufacturing the light guide element provided by the embodiment, incident light may enter the scattering structure from the light incident surface of the scattering structure. As the scattering structure includes the plurality of aerogel particles, the incident light will be scattered when irradiated to the aerogel particles, so as to change the relatively concentrated state of the incident light. Moreover, as the aerogel particles may be uniformly distributed and adjustable, it can ensure that the incident light is fully scattered, so as to improve the light-emitting uniformity of the light guide element and improve the light-emitting uniformity of the backlight assembly adopting the light guide element provided by the embodiment. On the other hand, a particle size of the aerogel particles is usually in the nanometer level, and the aerogel particles have Rayleigh scattering or Mie scattering effect. When the incident light is scattered by the aerogel particles, according to the particle size of the aerogel particles, light with specific wavelength range (e.g., yellow light or blue light) in the incident light has stronger scattering effect, and light with other wavelength ranges in the incident light has weaker scattering effect, so as to supplement the light with specific wavelength range, e.g., supplement the yellow light or the blue light. Thus, the color difference of emitted light of the light guide element can be reduced and even completely eliminated, so the whiteness of the emitted light of the light guide element can be improved, and hence stable and uniform white backlight can be provided.

For instance, the scattering structure may be an aerogel plate.

For instance, in the method for manufacturing the light guide element provided by one example of the embodiment, the raw materials for preparing the aerogel may include alkoxide, and the solvent includes an alcoholic solvent. Of course, the embodiment of the present invention includes but not limited thereto. The raw materials for preparing the aerogel may directly be aerogel particles.

For instance, the alkoxide may include one or more selected from silicon alkoxide, aluminum alkoxide and zirconium alkoxide.

For instance, the manufacturing method of the light guide element provided by one example of the embodiment further comprises: adjusting a pH value of the mixed solution to be 6-8, or obtaining the gel by volatilization of the solvent.

For instance, the manufacturing method of the light guide element provided by one example of the embodiment further comprises: uniformly mixing a plurality of luminous particles and the mixed solution before obtaining the gel. The luminous particles are the same as the aerogel particles and may also have the function of scattering the incident light, so that the emitted light of the light guide element can be more uniform. On the other hand, the luminous particles may also supplement light with specific wavelength range, e.g., supplement yellow light or blue light. It should be noted that: when the particle size of the aerogel particles is not in the nanometer level, the luminous particles may independently have the functions of scattering the incident light and supplementing the light with specific wavelength range.

For instance, in the manufacturing method of the light guide element provided by one example of the embodiment, the particle size range of at least one of the aerogel particle and the luminous particle (that is, the aerogel particle or the luminous particle or the aerogel particle and the luminous particle) is 190 nm-620 nm.

For instance, in the manufacturing method of the light guide element provided by one example of the embodiment, the luminous particle includes nanometer-level optically excited particles.

For instance, materials of the quantum dot may include one or more selected from carbon quantum dot, CdTe/CdS, CdS/CdTe/CdS, CdTe/CdS/CdS, CdTe/ZnS, CdTe/CdSe, CdTe/CdS/ZnS, CdTe/CdSe/CdTe and CdTe/CdSe/ZnS.

For instance, materials of the nanometer-level fluorescent powder may include one or more selected from Cs-doped TAG, Cs-doped TbAG, GaN and InGaN. Cs-doped TAG or TbAG may be excited to emit yellow light, and GaN or InGaN may be excited to emit blue light.

For instance, in the manufacturing method of the light guide element provided by one example of the embodiment, before obtaining the gel by treating the mixed solution, the nanometer-level optically excited particles and sol-gel may be uniformly mixed by using an ultrasonic mixing, and subsequently, the gel is prepared, and finally the scattering structure including the plurality of aerogel particles is obtained by ambient pressure drying or supercritical drying. In the drying process, the aerogel particles are preferentially nucleated and grown on the surface of the nanometer-level optically excited particles. On the basis of Ostwald ripening principle, after the drying process, the core-shell structure including the nanometer-level optically excited particle as the core and the aerogel particle as the shell may be obtained. The aerogel particles are waterproof and vapor-proof transparent materials. Thus, the aerogel particles can fully protect the nanometer-level optically excited particle and improve the stability and the light excitation efficiency of the nanometer-level optically excited particle.

Figure 8:
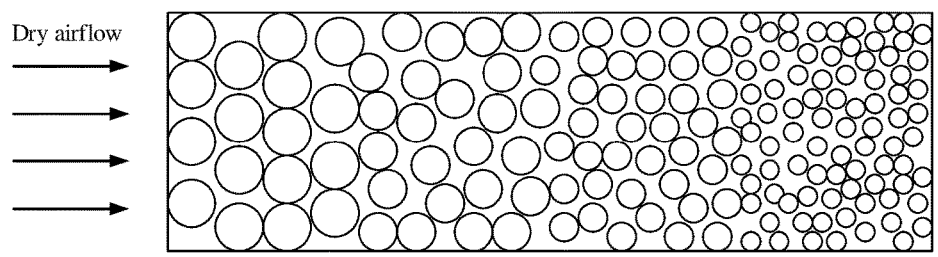
FIG. 8 is a schematic diagram of a method for manufacturing a light guide element, provided by an embodiment of the present invention.

For instance, the manufacturing method of the light guide element provided by one example of the embodiment further comprises: making the particle size or the density of at least one of the aerogel particle and the luminous particle in the aerogel to have anisotropy by utilization of the flow rate of dry airflow. For instance, as shown in FIG. 8, the dry airflow is disposed at one end of the gel to be dried; the sweeping direction of the dry airflow is from one end of the gel to be dried (for instance, corresponding to the light incident surface of the formed aerogel) to the other end; the initial sweeping speed of one end of the gel to be dried is 5-3 m/s; and the sweeping speed of the other end is gradually reduced to be 1-0.2 m/s. As the drying speed of one end of the gel to be dried is high, the growth velocity of the aerogel particle is high, so block-like aerogel, in which the particle size or the density of the aerogel particle has anisotropy, may be obtained. Therefore, the particle size or density distribution of the aerogel particles or the luminous particles in the incident direction of the incident light, in the first embodiment, can be achieved. Corresponding technical effects may refer to relevant description in the first embodiment. No further description will be given here.

Figure 9:
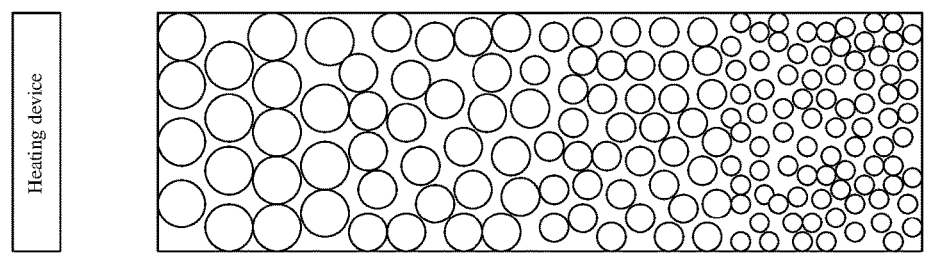
FIG. 9 is a schematic diagram of a method for manufacturing another light guide element, provided by an embodiment of the present invention.

For instance, the manufacturing method of the light guide element provided by one example of the embodiment further comprises: making the particle size or the density of at least one of the aerogel particle and the luminous particle in the aerogel to have anisotropy by utilization of the heating temperature gradient. For instance, as shown in FIG. 9, a heating device is disposed at one end of the gel to be dried; and the temperature gradient is gradually decreased from one end of the gel (for instance, corresponding to the light incident surface of the aerogel) to the other end. For instance, the drying temperature at one end of the gel to be dried may be set to be 80-50 □, and the drying temperature of the other end is gradually reduced to be 30-25 □. As the drying temperature of one end of the gel to be dried is high, the growth velocity of the aerogel particle is high, so block-like aerogel, in which the particle size or the density of the aerogel particle has anisotropy, may be obtained. Therefore, the particle size or density distribution of the aerogel particle or the luminous particle in the incident direction of the incident light, in the first embodiment, can be achieved. Corresponding technical effects may refer to relevant description in the first embodiment. No further description will be given here.

A Third Embodiment

The embodiment provides a backlight assembly, which comprises any light guide element provided by the first embodiment. As the backlight assembly comprises the light guide element provided by the first embodiment, the backlight assembly also has the technical effects corresponding to the light guide element in the first embodiment. No further description will be given here.

The following points should be noted:

(1) The accompanying drawings in the embodiments of the present invention only involve structures relevant to the embodiments of the present invention, and other structures may refer to the prior art.

(2) For clarity, in the accompanying drawings of the embodiments of the present invention, the thickness and size of the scattering structure, the light guide plate, the aerogel particle and the luminous particle is enlarged.

(3) A feature in the same embodiment of the present invention and a feature in different embodiments may be mutually combined without conflict.

The application claims priority to the Chinese patent application No. 201610342088.4, filed May 20, 2016, the disclosure of which is incorporated herein by reference as part of the application.

The invention claimed is:

1. A light guide element, comprising:
a scattering structure, including a plurality of aerogel particles,
wherein the scattering structure includes a light incident surface and a light-emitting surface and is configured to receive incident light incident into the light incident surface and emit the incident light from the light-emitting surface, and a particle size of the aerogel particle is set according to a color difference of the incident light,
wherein under a condition that the incident light is bluish, the range of the particle size of the aerogel particles is 570 nm-620 nm, and wherein under a condition that the incident light is yellowish, the range of the particle size of the aerogel particles is 19 nm-230 nm.

2. The light guide element according to claim 1, wherein in an incident direction of the incident light, a particle size of the aerogel particle is increased from 570 nm to 620 nm along with an increase of a distance between the aerogel particle and the light incident surface.

3. The light guide element according to claim 1, wherein in an incident direction of the incident light, a particle size of the aerogel particle is reduced from 230 nm to 190 nm along with an increase of a distance between the aerogel particle and the light incident surface.

4. The light guide element according to claim 1, further comprising a plurality of luminous particles.

5. The light guide element according to claim 4; wherein a range of a particle size of the luminous particle is 190 nm-620 nm.

6. The light guide element according to claim 4, wherein in an incident direction of the incident light, a particle size of the luminous particle is increased along with an increase of a distance between the luminous particle and the light incident surface.

7. The light guide element according to claim 4, wherein in an incident direction of the incident light, a particle size of the luminous particle is reduced along with an increase of a distance between the luminous particle and the light incident surface.

8. The light guide element according to claim 4, wherein the luminous particles include nanometer-level optically excited particles.

9. The light guide element according to claim 8, wherein the luminous particle includes a core-shell structure comprising the nanometer-level optically excited particle as the core and the aerogel particle as the shell.

10. The light guide element according to claim 8, wherein the nanometer-level optically excited particles includes a quantum dot or nanometer fluorescent powder.

11. The light guide element according to claim 1, further comprising: a reflecting film, disposed on other surfaces of the scattering structure except the light incident surface and the light-emitting surface.

12. A backlight assembly, comprising the light guide element according to claim 1.

13. A method for manufacturing a light guide element, comprising:
    obtaining a mixed solution by uniformly mixing raw materials for preparing aerogel and a solvent;
    obtaining gel by treating the mixed solution; and
    drying the gel to obtain a scattering structure including a plurality of aerogel particles, in which surfaces of the scattering structure include a light incident surface and a light-emitting surface,
    wherein a particle size of the aerogel particle is set according to a color difference of the incident light,
    wherein under a condition that the incident light is bluish, the range of the particle size of the aerogel particles is 570 nm-620 nm, and
    wherein under a condition that the incident light is yellowish, the range of the particle size of the aerogel particles is 190 nm-230 nm.

14. The method for manufacturing the light guide element according to claim 13, wherein the raw materials for preparing the aerogel include alkoxide, and the solvent includes an alcoholic solvent.

15. The method for manufacturing the light guide element according to claim 14, wherein the alkoxide includes one or more selected from silicon alkoxide, aluminum alkoxide and zirconium alkoxide.

16. The method for manufacturing the light guide element according to claim 13, wherein the luminous particles include nanometer-level optically excited particles.

17. The method for manufacturing the light guide element according to claim 13, further comprising:
    making a particle size or a density of the aerogel particle in the aerogel to have anisotropy by utilization of at least one of a flow rate of dry airflow or a heating temperature gradient.

* * * * *